US012601883B2

(12) United States Patent
Okubo et al.

(10) Patent No.: US 12,601,883 B2
(45) Date of Patent: Apr. 14, 2026

(54) OPTICAL FIBER RIBBON AND SLOTLESS OPTICAL CABLE

(71) Applicant: SWCC Corporation, Kawasaki (JP)

(72) Inventors: Keita Okubo, Kawasaki (JP); Takeshiro Nagai, Kawasaki (JP); Wataru Noro, Kawasaki (JP)

(73) Assignee: SWCC Corporation, Kawasaki (JP)

( * ) Notice: Subject to any disclaimer, the term of this patent is extended or adjusted under 35 U.S.C. 154(b) by 313 days.

(21) Appl. No.: 18/574,494

(22) PCT Filed: Aug. 26, 2022

(86) PCT No.: PCT/JP2022/032278
§ 371 (c)(1),
(2) Date: Dec. 27, 2023

(87) PCT Pub. No.: WO2024/042726
PCT Pub. Date: Feb. 29, 2024

(65) Prior Publication Data
US 2025/0102752 A1 Mar. 27, 2025

(51) Int. Cl.
*G02B 6/44* (2006.01)

(52) U.S. Cl.
CPC ......... *G02B 6/4403* (2013.01); *G02B 6/4431* (2023.05); *G02B 6/4432* (2013.01)

(58) Field of Classification Search
None
See application file for complete search history.

(56) References Cited

U.S. PATENT DOCUMENTS

2016/0070079 A1* 3/2016 Sajima ................. G02B 6/4404
385/114
2021/0165180 A1 6/2021 Chiasson et al.

FOREIGN PATENT DOCUMENTS

JP        H0634831 A       2/1994
JP        2005114830 A     4/2005
JP        2014219496 A     11/2014
JP        2021012332 A  *  2/2021    ............... G02B 6/44
(Continued)

OTHER PUBLICATIONS

PCT International Search Report and Written Opinion for International Application No. PCT/JP2022/032278, dated November, 1, 2022, 8pp.

*Primary Examiner* — Uyen Chau N Le
(74) *Attorney, Agent, or Firm* — The Roy Gross Law Firm, LLC; Roy D. Gross

(57) ABSTRACT

An optical fiber ribbon includes a plurality of single-core coated optical fibers arranged in parallel, and a resin layer integrally coating the plurality of single-core coated optical fibers and intermittently coupling together adjacent ones of the single-core coated optical fibers. The resin layer includes, at a portion coating the single-core coated optical fibers, a thick-walled part and a thin-walled part along a longitudinal direction of the single-core coated optical fibers, the thick-walled part being formed to have a thickness equal to or greater than ½ of a maximum thickness, the thin-walled part being formed to have a thickness of less than ½ of the maximum thickness. When a length of the thick-walled part in the longitudinal direction is denoted by "a" and a length of the thin-walled part in the longitudinal direction is denoted by "b," 4:6<b:a<8:2 is satisfied.

5 Claims, 4 Drawing Sheets

(56)  References Cited

FOREIGN PATENT DOCUMENTS

| JP | 2022042193 A | 3/2022 | |
|----|--------------|--------|----|
| WO | WO-2014181730 A1 * | 11/2014 | .......... G02B 6/4404 |
| WO | 2018105424 A | 6/2018 | |
| WO | 2021005826 A | 1/2021 | |

* cited by examiner

OPTICAL FIBER RIBBON AND SLOTLESS OPTICAL CABLE

CROSS REFERENCE TO RELATED APPLICATIONS

This application is a National Phase of PCT Patent Application No. PCT/JP2022/032278 having International filing date of Aug. 26, 2022, the contents of which are incorporated herein by reference in their entirety.

TECHNICAL FIELD

The present invention relates to an optical fiber ribbon and a slotless optical cable.

BACKGROUND ART

In recent years, data traffic has increased dramatically due to popularization of Internet of Things (IoT), full-scale 5G commercialization, autonomous driving of automobiles, and so on, and worldwide demand has been increasing for the maintenance and construction of high-speed and high-capacity optical fiber communication networks that support such traffic.

In particular, information communication cables in European and American countries are often laid in underground ducts, and are physically constrained by the laying space in the ducts. In order to economically realize the maintenance and construction of high-speed and high-capacity optical fiber communication networks in the European and American countries, reducing the laying cost by introducing a cable which includes optical fiber cores at a higher density than a conventional cable while continuingly using existing ducts is strongly demanded.

As an example of such a high-density optical cable, an optical cable using an intermittent-coupling type optical fiber ribbon is disclosed in Patent Literature (hereinafter, referred to as "PTL") 1. The intermittent-coupling type optical fiber ribbon includes a plurality of optical fibers arranged in parallel and a tape resin layer covering and coupling together the plurality of optical fibers. Adjacent ones of the optical fibers are intermittently coupled to or separated from one another. The tape resin layer is generally formed to have a uniform thickness along the longitudinal direction of the optical fiber ribbon (see FIG. 1 of PTL 1).

CITATION LIST

Patent Literature

PTL 1
Japanese Patent Application Laid-Open No. 2022-042193

DISCLOSURE OF INVENTION

Technical Problem

In the conventional optical fiber ribbon in which the tape resin layer is formed to have a uniform thickness along the longitudinal direction as described above, the coating amount of the tape resin layer is sufficient, and therefore, the intermittent shape of the optical fiber ribbon is unlikely to be destroyed in, for example, a step of twisting the optical fiber ribbon. The optical fiber ribbon has a high ironing strength.

However, in the case of such an optical fiber ribbon, peeling off (wiping) the tape resin layer has been uneasy.

That is, when the optical cable is laid, the optical cable is cut into certain lengths, and then a jacket and/or the tape resin layer of the optical fiber ribbon are removed. Then, the exposed optical fiber is connected to equipment. Removal of the tape resin layer is performed by, for example, sandwiching the optical fiber ribbon between peeling blades or the like having sharp protrusions, then pulling the optical fiber ribbon, and wiping the tape resin layer. Since the thickness of the tape resin layer is uniform in the conventional optical fiber ribbon, the projections of the blades are not easily caught, and wiping is not easy.

A main object of the present invention is to provide an optical fiber ribbon that facilitates wiping removal (removal by wiping) of a tape resin layer while maintaining a preferable ironing strength, and a slotless optical cable using the optical fiber ribbon.

Solution to Problem

According to an aspect of the present invention to solve the above problems, an optical fiber ribbon is provided, the optical fiber ribbon including:
  a plurality of single-core coated optical fibers arranged in parallel; and
  a tape resin layer integrally coating the plurality of single-core coated optical fibers and intermittently coupling together adjacent ones of the plurality of single-core coated optical fibers, in which
  the tape resin layer includes, at a portion coating the plurality of single-core coated optical fibers, a thick-walled part and a thin-walled part along a longitudinal direction of the plurality of single-core coated optical fibers, the thick-walled part being formed to have a thickness equal to or greater than ½ of a maximum thickness, the thin-walled part being formed to have a thickness of less than ½ of the maximum thickness, the thick-walled part and the thin-walled part being disposed alternately along the longitudinal direction, and
  when a length of the thick-walled part in the longitudinal direction is denoted by "a" and a length of the thin-walled part in the longitudinal direction is denoted by "b," $4:6 < b:a < 8:2$ is satisfied.

According to another aspect of the present invention, a slotless optical cable is provided, the slotless optical cable including:
  the above-described optical fiber ribbon;
  a press winding for fixing a plurality of the optical fiber ribbons;
  a jacket covering the press winding;
  a tension member installed in the jacket; and
  a rip cord installed in the jacket for tearing the jacket.

Advantageous Effects of Invention

According to the present invention, it is possible to provide an optical fiber ribbon in which wiping removal of a tape resin layer is easy while a preferable ironing strength is maintained.

DESCRIPTION OF EMBODIMENTS

An optical fiber ribbon and a slotless optical cable according to a preferred embodiment of the present invention will be described. With respect to the description "to" indicating a numerical range, the lower limit value and the upper limit value are included in the numerical range in the present specification.

[Optical Fiber Ribbon]

Figure 1:
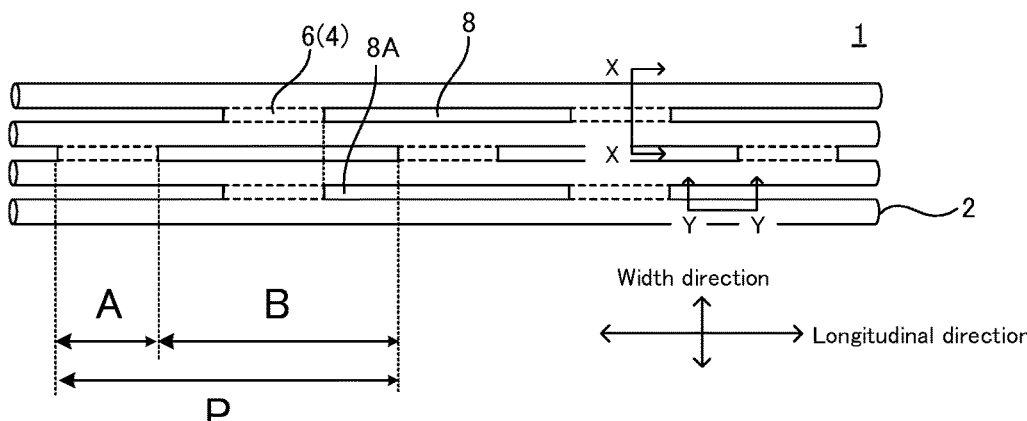
FIG. 1 is a plan view illustrating a schematic configuration of an optical fiber ribbon.
Figure 2:
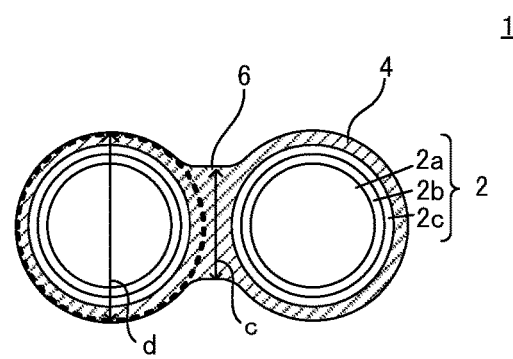
FIG. 2 is a cross-sectional view of FIG. 1 taken along line X-X.
Figure 3:
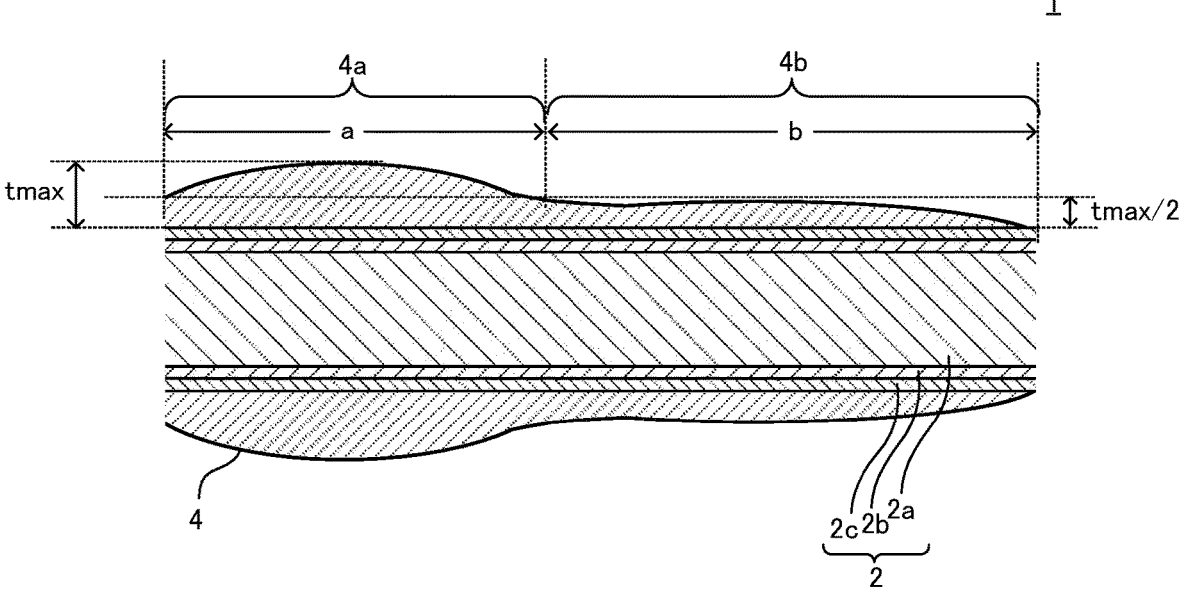
FIG. 3 is a sectional view of FIG. 1 taken along line Y-Y.

FIG. 1 is a plan view illustrating a schematic configuration of optical fiber ribbon 1. FIG. 2 is a cross-sectional view of FIG. 1 taken along line X-X. FIG. 3 is a sectional view of FIG. 1 taken along line Y-Y; (a sectional view taken through the axial center of single-core coated optical fiber 2). FIG. 3 illustrates the principal parts, which are enlarged for the sake of clarity.

As illustrated in FIGS. 1 and 2, optical fiber ribbon 1 includes a plurality of single-core coated optical fibers 2 arranged in parallel and tape resin layer 4 integrally coating them. Here, a plurality of (four in FIG. 1) single-core coated optical fibers 2 independent for each core are coupled to one another, but bundles of single-core coated optical fibers may be coupled together for each two cores.

Each of single-core coated optical fibers 2 has a configuration in which optical fiber strand 2a is coated with primary coating layer 2b and secondary coating layer 2c successively (see FIG. 2).

Tape resin layer 4 integrally coats the plurality of single-core coated optical fibers 2, and intermittently couples together adjacent single-core coated optical fibers 2. Specifically, tape resin layer 4 includes a plurality of coupling portions 6 and a plurality of separating portions 8 (see FIG. 1).

Coupling portions 6 are portions coupling together adjacent single-core coated optical fibers 2, and are disposed intermittently in the length direction and the width direction. Thickness c of each of coupling portions 6 as seen in the cross section may be, for example, 0.14 to 0.19 mm. Length A of coupling portion 6 in the longitudinal direction may be, for example, 39 to 43 mm.

Separating portions 8 are portions separating adjacent single-core coated optical fibers 2, and are disposed intermittently in the length direction and the width direction. In separating portions 8, non-coupling portion 8A in which separating portions 8 adjacent to each other as seen in the width direction overlap each other is formed. Length B of each of separating portions 8 in the longitudinal direction may be equal to or longer than length A of coupling portion 6 in the longitudinal direction, and may, for example, be 98 to 103 mm. Periodic intervals P of coupling portions 6 in the longitudinal direction are, for example, 150 mm or less.

Tape resin layer 4 is mainly composed of a cured product of a photocurable resin, a cured product of a thermosetting resin, or a thermoplastic resin, and is preferably a cured product of a photocurable resin. The photocurable resin is not particularly limited, but is, for example, an epoxy acrylate-based photocurable resin, a urethane acrylate-based photocurable resin, or the like.

As illustrated in FIG. 3, the resin thickness of a part of tape resin layer 4 which coats single-core coated optical fibers 2 varies in the longitudinal direction, and the tape resin layer is thus provided with regular or irregular unevenness. Specifically, tape resin layer 4 includes, at the portion coating single-core coated optical fibers 2, thick-walled part 4a and thin-walled part 4b which are formed along the longitudinal direction. One or more thick-walled parts 4a and one or more thin-walled parts 4b may be disposed. For example, when a plurality of thick-walled parts 4a and a plurality of thin-walled parts 4b are disposed, the thick-walled parts and thin-walled parts may be disposed regularly or irregularly in the longitudinal direction.

Thick-walled part 4a is a part formed to have a thickness equal to or greater than ½ of the maximum thickness (tmax) of tape resin layer 4. Thin-walled part 4b is a part formed to have a thickness less than ½ of the maximum thickness. The lower limit of the thickness of thin-walled part 4b only needs to be greater than 0 μm, and is, for example, 1 μm or greater.

Here, the maximum thickness (tmax) of tape resin layer 4 means the maximum thickness of tape resin layer 4 in a cross section extending through the axial center of single-core coated optical fiber 2 along the longitudinal direction of optical fiber ribbon 1. Specifically, among cross sections extending through the axial centers of single-core coated optical fibers 2 along the longitudinal direction, the maximum thickness means the maximum thickness of tape resin layer 4 in one cross section extending in a direction perpendicular to a direction in which the plurality of single-core coated optical fibers 2 are arranged.

As described above, by forming a part (thin-walled part 4b) having a small thickness of tape resin layer 4 in the longitudinal direction, the tape resin layer can be easily caught by the projections of peeling blades, and can be easily removed by wiping. However, when length b of thin-walled part 4b of tape resin layer 4 in the longitudinal direction is too long, the coating amount of tape resin layer 4 is reduced. Therefore, when optical fiber ribbon 1 passes through a pulley or the like in a step of stranding optical fiber ribbons 1, it is likely that the intermittent form of optical fiber ribbon 1 is broken and the ironing strength of optical fiber ribbon 1 is lowered. Further, as length b of thin-walled part 4b increases, a load to be applied to the resin of tape resin layer 4 becomes smaller, and the shear stress also becomes smaller. Thus, the wiping characteristics are unlikely to be improved.

Therefore, length a of thick-walled part 4a and length b of thin-walled part 4b in the longitudinal direction of tape resin layer 4 are adjusted so as to satisfy the following relation:

$$4{:}6 < b{:}a < 8{:}2.$$

As described above, by making length b of thin-walled part 4b in the longitudinal direction appropriately long, it is possible to increase the number of portions caught by the projections of the peeling blades during removal of tape resin layer 4, so as to facilitate wiping. Further, by not making length b of thin-walled part 4b in the longitudinal direction too long, the intermittent shape of optical fiber ribbon 1 is unlikely to be broken in the step of stranding optical fiber ribbons 1 and a decrease in ironing strength can be suppressed because the coating amount of tape resin layer 4 can be secured. From the same viewpoint, it is preferable that $5:5 \leq b:a \leq 7:3$ hold true.

Length b of thin-walled part 4b in the longitudinal direction is not particularly limited, but is preferably greater than 16 mm and less than 32 mm, and, more preferably, is 20 to 28 mm. When length b of thin-walled part 4b is equal to or greater than a certain value, the wiping removal characteristics can be further enhanced. When length b of thin-walled part 4b in the longitudinal direction is equal to or less than a certain value, a decrease in the ironing strength is more likely to be suppressed.

Maximum thickness tmax of tape resin layer 4 is preferably, for example, 0.01 to 0.02 mm, and more preferably 0.01 to 0.018 mm.

Length a of thick-walled part 4a in the longitudinal direction, length b of thin-walled part 4b in the longitudinal direction, and maximum thickness tmax of tape resin layer 4 can be measured by the following method.

To begin with, three coupling portions 6 are chosen arbitrarily from a plurality of coupling portions 6, the thicknesses of coupling portions 6 of the optical fiber ribbon are continuously measured using a microscope manufactured by Keyence Corporation, and the outer diameter of the single-core coated optical fiber is subtracted from each of the thicknesses. The thickness distribution of tape resin layer 4 is thus obtained.

Next, in the thickness distribution, a part of tape resin layer 4 having a thickness equal to or greater than ½ of the maximum value of the thickness of tape resin layer 4 is defined as the thick-walled part, and a part of tape resin layer 4 having a thickness less than ½ of the maximum value is defined as the thin-walled part. Then, the lengths of thick-walled parts in the longitudinal direction are measured, and the average value thereof is obtained as length a of the thick-walled parts. Similarly, the lengths of thin-walled parts in the longitudinal direction are measured, and the average value thereof is obtained as length b of the thin-walled parts.

In addition, maximum thickness tmax of tape resin layer 4 is also obtained by obtaining the maximum thicknesses of the thick-walled parts in the above-described thickness distribution, and by averaging the obtained maximum thicknesses.

The distribution states of thick-walled parts 4a and thin-walled parts 4b in the longitudinal direction may or may not be aligned in the direction in which the plurality of single-core coated optical fibers 2 are arranged (lateral direction in FIG. 1).

According to above-described optical fiber ribbon 1, it is possible to facilitate wiping removal of tape resin layer 4 while maintaining a preferable ironing strength.

[Production Apparatus and Production Method for Producing Optical Fiber Ribbon]

(1) Production Apparatus for Producing Optical Fiber Ribbon

Figure 4:
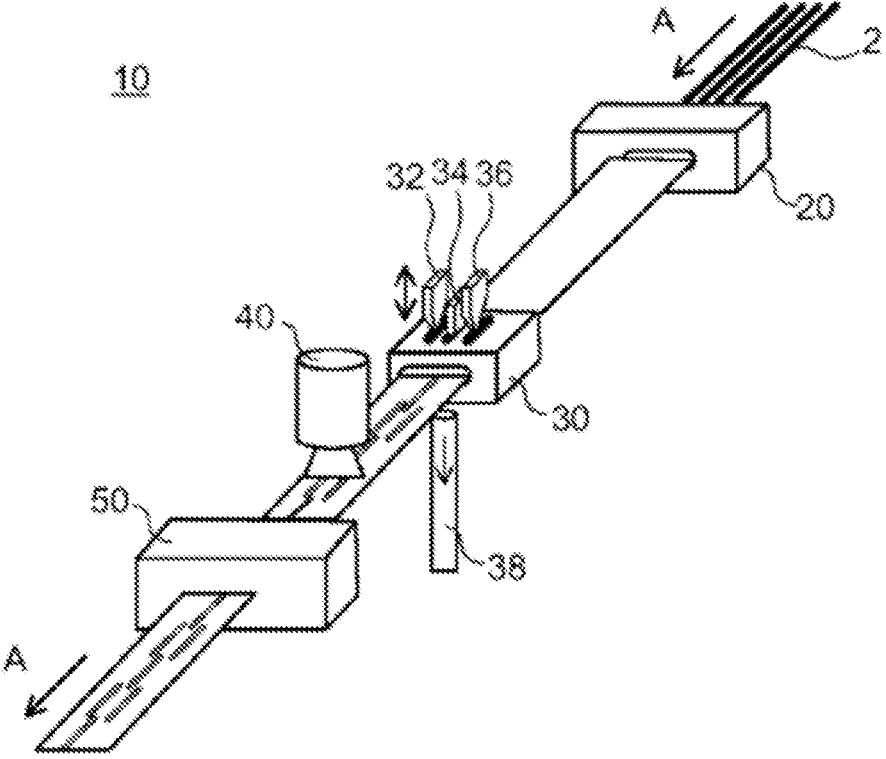
FIG. 4 is a perspective view illustrating a schematic configuration of an production apparatus for producing the optical fiber ribbon.

FIG. 4 is a diagram illustrating a schematic configuration of production apparatus 10 for producing the optical fiber ribbon.

As illustrated in FIG. 4, production apparatus 10 for producing the optical fiber ribbon is configured such that, mainly, tape die 20, separation die 30, and two light irradiation apparatuses 40 and 50 are installed in this order along conveyance direction A of single-core coated optical fibers 2, and single-core coated optical fibers 2 pass through these dice and the apparatuses in the order presented.

Tape die 20 is a general-purpose die for collectively coating the periphery of the plurality of single-core coated optical fibers 2 with a photocurable resin, and is configured to apply, in the form of tape, the uncured photocurable resin to the plurality of single-core coated optical fibers 2 passing through the tape die, so as to form tape resin layer 4.

Here, thick-walled part 4a and thin-walled part 4b described above can be formed, for example, by varying the application amount of the photocurable resin, that is, the application pressure, the application temperature (viscosity), and the like.

Separation die 30 is provided with a plurality of (three in FIG. 4) separation needles 32, 34, and 36 which are vertically movable. Separation needles 32, 34, and 36 are disposed between and above single-core coated optical fibers 2, and middle separation needle 34 and opposite separation needles 32 and 36 are alternately raised and lowered with respect to the uncured photocurable resin. Separating portions 8 and coupling portions 6 are thus intermittently formed.

Resin suction apparatus 38 for sucking excess photocurable resin is installed in separation die 30. Resin suction apparatus 38 is configured to suck the excess photocurable resin blocked by the downward movement of separation needles 32, 34, and 36.

Upstream light irradiation apparatus 40 irradiates the uncured photocurable resin with light, and is configured to semi-cure the photocurable resin. The term "semi-curing" means a state in which the resin is not fully cured, that is, a state in which the resin is partially cross-linked by light energy.

Downstream light irradiation apparatus 50 further irradiates the semi-cured photocurable resin with light, and is configured to fully cure the photocurable resin. The term "fully curing" means a state in which the resin is cured to a state of being fully or nearly fully cured, that is, a state in which the resin is cross-linked to a state of being fully or nearly fully cross-linked by light energy.

Of upstream light irradiation apparatus 40 and downstream light irradiation apparatus 50, the integral irradiation amount is smaller in upstream light irradiation apparatus 40 and the integral irradiation amount is larger in downstream light irradiation apparatus 50.

(2) Production Method for Producing Optical Fiber Ribbon

When the plurality of single-core coated optical fibers 2 are conveyed along conveyance direction A (the conveyance speed is preferably 60 to 300 m/min), the uncured photocurable resin is first applied to the plurality of single-core coated optical fibers 2 in the form of tape by tape die 20. Here, as described above, thick-walled parts 4a and thin-walled parts 4b described above can be formed regularly or irregularly, for example, by varying the application amount. Further, the photocurable resin is photocured to form tape resin layer 4.

Then, separation needles 32, 34, and 36 of separation die 30 are moved up and down with respect to tape resin layer 4, to form separating portions 8 and coupling portions 6 in tape resin layer 4.

Then, light irradiation apparatus 40 irradiates tape resin layer 4 with light to semi-cure the uncured photocurable resin. Finally, light irradiation apparatus 50 further irradiates the semi-cured photocurable resin with light to fully cure the semi-cured photocurable resin. During the processing of these steps, the temperature of tape die 20 is set higher than the temperature of separation die 30.

[Slotless Optical Cable]

Figure 5:
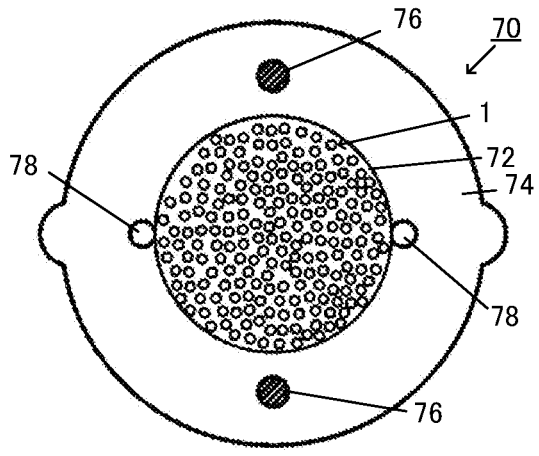
FIG. 5 is a cross-sectional view illustrating a schematic configuration of a slotless optical cable.

FIG. 5 is a cross-sectional view illustrating a schematic configuration of slotless optical cable 70 using optical fiber ribbon 1.

In slotless optical cable 70, a plurality of optical fiber ribbons 1 are bundled and stranded together, and are fixed by press winding 72. For example, 12 strips of 12-core optical fiber ribbon 1 are bundled together, and six bundles are stranded together. Then, the stranded body is fixed by press winding 72. As described above, in each of optical fiber ribbons 1, thick-walled parts 4a and thin-walled parts 4b are regularly or irregularly formed in the longitudinal direction of tape resin layers 4.

It is preferable that a water-absorbing non-woven fabric be used as press winding 72, and in particular a non-woven fabric on which a water-absorbing polymer is laminated is used.

A polyethylene resin or the like is extruded onto press winding 72, and press winding 72 is covered by jacket 74. One tension member 76 is installed in jacket 74 on each of the upper and lower sides, and one rip cord 78 for tearing jacket 74 is also installed on each of the left and right sides.

According to slotless optical cable 70 described above, tension members 76 are installed on the upper and lower sides in FIG. 5. Accordingly, the flexibility in the left-right direction is secured, and it is thus possible to improve the workability for laying the slotless optical cable in a duct. Since rip cords 78 are also installed at symmetric positions in the left-right direction (180-degree opposite positions) in FIG. 5, jacket 74 is easily divided in two equal portions and peeled off. It is thus possible to improve the workability for cable termination or intermediate branching.

[Variation]

In the above embodiment, the sectional shape of tape resin layer 4 is not limited to the shape illustrated in FIG. 3, and may be a pulse shape or a waveform.

EXAMPLES (1) Manufacture of Samples

To begin with, a single-core coated optical fiber having an outer diameter of 250 μm was prepared by applying a primary coating made of a urethane acrylate-based photocurable resin having a Young's modulus of about 5 MPa at 23° C. and a secondary coating made of a urethane acrylate-based photocurable resin having a Young's modulus of about 700 MPa at 23° C. to a quartz glass-based SM optical fiber having an outer diameter of 125 μm.

Thereafter, by using the same production apparatus as in FIG. 3 in a state where four single-core coated optical fibers were arranged, Samples 1 to 6 of the optical fiber ribbon in which ratio b:a between length a of the thick-walled part and length b of the thin-walled part of tape resin layer 4 in the longitudinal direction is adjusted as illustrated in Table 1 were produced by applying and photocuring the urethane acrylate-based photocurable resin (viscosity at 25° C. prior to curing is 5.2±0.5 Pa's and Young's modulus after curing is 550 MPa). The length of the thick-walled part in the longitudinal direction and the length of the thin-walled part in the longitudinal direction were adjusted by varying the application amount. The case where ratio b:a is 10:0 is a case where the thickness of tape resin layer 4 was not made uneven.

Length a of thick-walled part 4a and length b of thin-walled part 4b in the longitudinal direction were obtained in the following steps.

To begin with, three coupling portions 6 were chosen arbitrarily from a plurality of coupling portions 6, the thicknesses of coupling portions 6 of the optical fiber ribbon were continuously measured using a microscope manufactured by Keyence Corporation, and the outer diameter of the single-core coated optical fiber was subtracted from each of the thicknesses. The thickness distribution of tape resin layer 4 in the longitudinal direction was thus obtained. In the obtained thickness distribution, a part of tape resin layer 4 having a thickness equal to or greater than ½ of the maximum value of the thickness of tape resin layer 4 was defined as the thick-walled part, and a part of tape resin layer 4 having a thickness less than ½ of the maximum value was defined as the thin-walled part. Further, the lengths of the respective parts in the longitudinal direction were measured to obtain average values thereof. The average values were set as the lengths of the respective parts.

In addition, maximum thickness tmax of tape resin layer 4 was also obtained by calculating the maximum thicknesses of the thick-walled parts in the above-described thickness distribution, and by averaging the calculated maximum thicknesses.

In addition, thickness c of coupling portion 6 in the cross section was 0.14 mm, length A of coupling portion 6 in the longitudinal direction was 41 mm, length B of separating portion 8 in the longitudinal direction is 100 mm, and periodic interval P of coupling portion 6 in the longitudinal direction was 140 mm.

(2) Evaluation of Sample (2.1) Evaluation of Wiping Characteristics

Figure 6A:
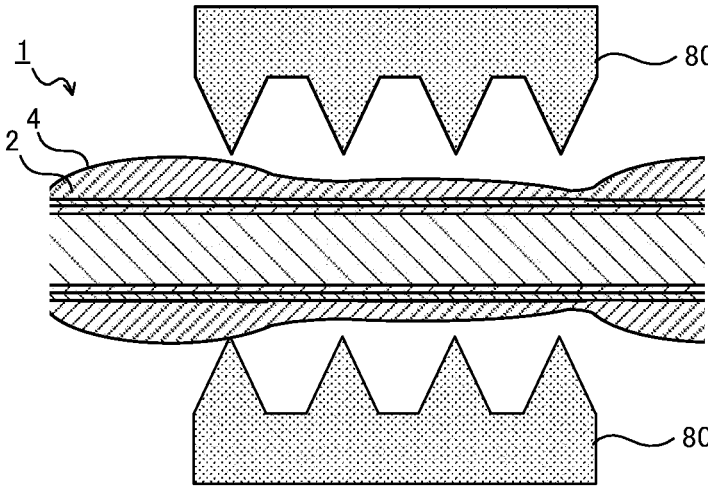
FIG. 6A is a schematic diagram illustrating an evaluation method for evaluating wiping characteristics.
Figure 6B:
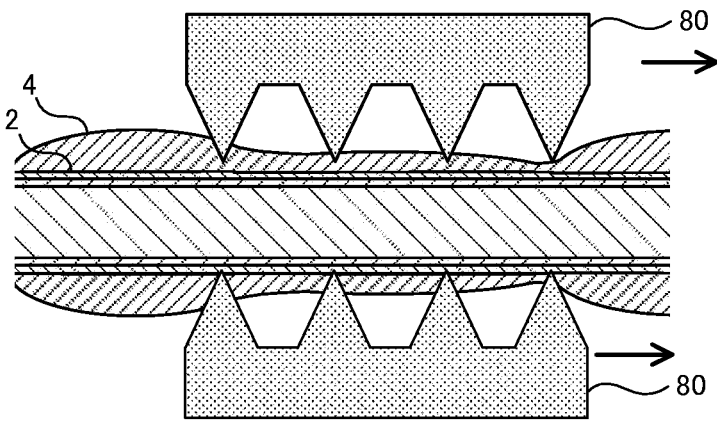
FIG. 6B is a schematic diagram illustrating the evaluation method for evaluating the wiping characteristics.
Figure 6C:
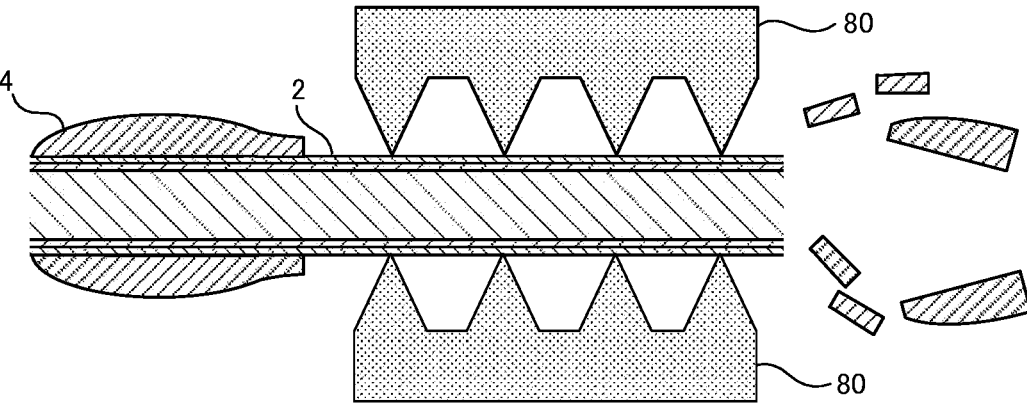
FIG. 6C is a schematic diagram illustrating the evaluation method for evaluating the wiping characteristics.

Optical fiber ribbon 1 was cut into 10 cm lengths. As illustrated in FIG. 6A, tape resin layer 4 was peeled off from optical fiber ribbon 1 by being sandwiched between pieces of Velcro (registered trademark) 80 having sharp projections and being pulled in one direction under pressure (see FIGS. 6B and 6C). Then, the number of times of peeling required until tape resin layer 4 was peeled off from optical fiber ribbon 1 was counted. Then, the evaluation was conducted based on the following criteria.

○: the number of times of peeling is 3 or less.

Δ: the number of times of peeling is 4 or 5.

X: the number of times of peeling is 6 or more.

(2.2) Measurement of Ironing Strength

Figure 7A:
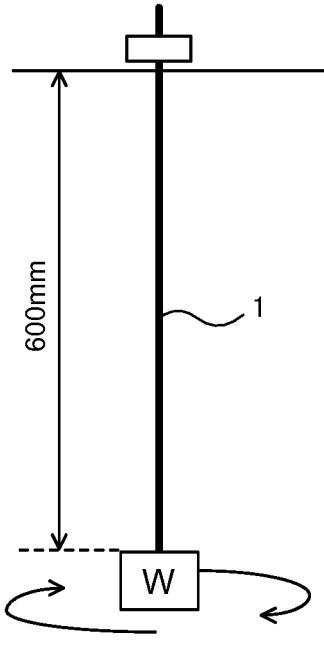
FIG. 7A is a schematic view illustrating a measurement method for measuring an ironing strength.

Optical fiber ribbon 1 was cut into predefined lengths. As illustrated in FIG. 7A, one end of the optical fiber ribbon was fixed and weight W with a load of 500 gf was hanged on the other end of the optical fiber ribbon to apply tension, and optical fiber ribbon was twisted a prescribed number of times. The length of a hanged portion of optical fiber ribbon 1 was 600 mm.

Figure 7B:
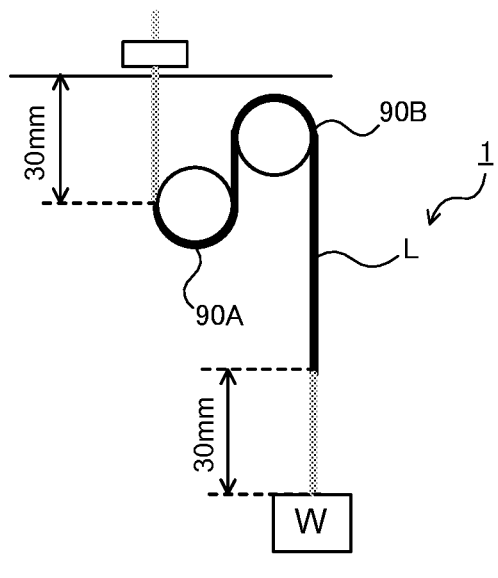
FIG. 7B is a schematic view illustrating the measurement method for measuring the ironing strength.

Then, as illustrated in FIG. 7B, twisted optical fiber ribbon 1 was placed on two rolls 90A and 90B of φ16 mm so as to be bent 180° at each of the rolls. Then, rolls 90A and 90B were reciprocated vertically, and ironing was applied to portion L (black thick line portion) extending over a length of 540 mm of optical fiber ribbon 1. At this time, weight W was fixed such that optical fiber ribbon 1 did not turn.

Figure 7C:
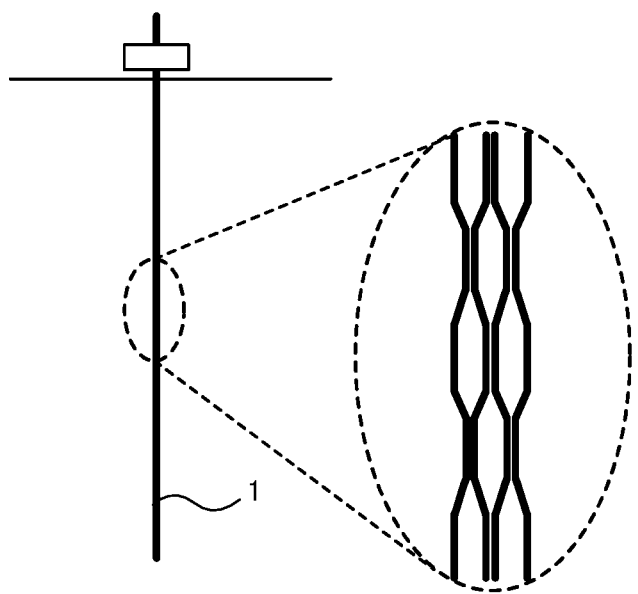
FIG. 7C is a schematic view illustrating the measurement method for measuring the ironing strength.

Then, as illustrated in FIG. 7C, after rolls 90A and 90B were removed and the tension is released, visual observation was conducted of whether or not the intermittent form of optical fiber ribbon 1 was broken.

These operations were repeated while increasing the number of times of twisting. Then, the maximum number of times of twisting the intermittent shape of the optical fiber ribbon is not destroyed was counted.

○: maximum number of times of twisting is 4 or more.
    Δ: maximum number of times of twisting is 2 or 3.
    X: maximum number of times of twisting is 1 or less.
    A measurement result is shown in Table 1.

TABLE 1

| | Tape Resin Layer Configuration | | | Evaluation | | |
| | b:a (length of thin-walled part:length of thick-walled part) | Length b of thin-walled part (mm) | Maximum thickness tmax (mm) | Ironing strength | Wiping | Remarks |
| Sample | | | | | | |
|---|---|---|---|---|---|---|
| 1 | 8:2 | 32 | 0.011 | x | x | Comparative Example |
| 2 | 7:3 | 28 | | ○ | ○ | Example |
| 3 | 6:4 | 24 | | ○ | ○ | Example |
| 4 | 5:5 | 20 | | ○ | ○ | Example |
| 5 | 4:6 | 16 | | ○ | x | Comparative Example |
| 6 | 0:10 | — | | ○ | x | Comparative Example |

(3) Summary

As shown in Table 1, in Sample 1, the ironing strength was low, and the wiping characteristics were also as low as a conventional optical fiber ribbon (Sample 4). It is presumed that the wiping characteristics were low because the load applied to the resin of tape resin layer 4 decreases and the shear stress decreases with increasing length b of thin-walled part 4b. It is presumed that the ironing strength decreased because length a of thick-walled part 4a in the longitudinal direction was short, the coating amount by tape resin layer 4 decreased, and the strength could not be maintained.

Meanwhile, in Sample 5, the wiping characteristics were not improved. This is presumed to be because length b of thin-walled part 4b in the longitudinal direction was so short that the optical fiber ribbon is unlikely to be caught by the projections of Velcro 80.

In contrast, in Samples 2 to 4, the wiping characteristics were also improved while the ironing strength was maintained satisfactorily. From these results, it was found that adjusting the ratio within the range of 4:6<b:a<8:2 is useful.

INDUSTRIAL APPLICABILITY

According to the present invention, it is possible to provide an optical fiber ribbon that facilitates wiping removal of a tape resin layer while maintaining a preferable ironing strength, and a slotless optical cable using the optical fiber ribbon.

REFERENCE SIGNS LIST

1 Optical fiber ribbon
2 Single-core coated optical fiber
4 Tape resin layer
6 Coupling portion
8 Separating portion
8A Non-coupling portion
10 Production apparatus for producing optical fiber ribbon
20 Tape die
30 Separation die
32, 34, 36 Separation needle
38 Resin suction apparatus
40 (Upstream) light irradiation apparatus
50 (Downstream) light irradiation apparatus
70 Slotless optical cable
72 Press winding
74 Jacket
76 Tension member
78 Rip cord
80 Velcro
90A, 90B Roll

The invention claimed is:

1. An optical fiber ribbon, comprising:
a plurality of single-core coated optical fibers arranged in parallel; and
a tape resin layer integrally coating the plurality of single-core coated optical fibers and intermittently coupling together adjacent ones of the plurality of single-core coated optical fibers, wherein
the tape resin layer includes, at a portion coating the plurality of single-core coated optical fibers, a thick-walled part and a thin-walled part along a longitudinal direction of the plurality of single-core coated optical fibers, the thick-walled part being formed to have a thickness equal to or greater than ½ of a maximum thickness, the thin-walled part being formed to have a thickness of less than ½ of the maximum thickness, and
when a length of the thick-walled part in the longitudinal direction is denoted by "a" and a length of the thin-walled part in the longitudinal direction is denoted by "b," $4{:}6 < b{:}a < 8{:}2$ is satisfied.

2. The optical fiber ribbon according to claim 1, wherein the length a of the thick-walled part in the longitudinal direction and the length b of the thin-walled part in the longitudinal direction satisfy $5{:}5 \leq b{:}a \leq 7{:}3$.

3. The optical fiber ribbon according to claim 1, wherein the length b of each of a plurality of the thin-walled parts in the longitudinal direction is 20 to 28 mm.

4. The optical fiber ribbon according to claim 1, wherein the maximum thickness of the tape resin layer is 0.01 to 0.02 mm.

5. A slotless optical cable, comprising:
a plurality of optical fiber ribbons according to claim 1;
a press winding for fixing the plurality of optical fiber ribbons;
a jacket covering the press winding;
a tension member installed in the jacket; and
a rip cord installed in the jacket for tearing the jacket.

\* \* \* \* \*